United States Patent
Park et al.

(10) Patent No.: US 10,693,121 B2
(45) Date of Patent: Jun. 23, 2020

(54) RECHARGEABLE BATTERY

(71) Applicant: SAMSUNG SDI CO., LTD., Yongin-si, Gyeonggi-do (KR)

(72) Inventors: Sang-Kyoon Park, Yongin-si (KR); Yong-Chul Seo, Yongin-si (KR); Seung-Ho Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 82 days.

(21) Appl. No.: 14/732,475

(22) Filed: Jun. 5, 2015

(65) Prior Publication Data

US 2016/0049635 A1 Feb. 18, 2016

(30) Foreign Application Priority Data

Aug. 14, 2014 (KR) ........................ 10-2014-0106314

(51) Int. Cl.
*H01M 2/34* (2006.01)
*H01M 2/26* (2006.01)
(Continued)

(52) U.S. Cl.
CPC ........... *H01M 2/348* (2013.01); *H01M 2/263* (2013.01); *H01M 10/0431* (2013.01); *H01M 10/0525* (2013.01); *H01M 2200/103* (2013.01)

(58) Field of Classification Search
None
See application file for complete search history.

(56) References Cited

U.S. PATENT DOCUMENTS

| 8,658,307 B2 * | 2/2014 | Byun | H01M 2/263 429/178 |
| 8,927,141 B2 * | 1/2015 | Kim | H01M 2/0443 429/129 |

(Continued)

FOREIGN PATENT DOCUMENTS

| JP | 2013-8559 | * | 1/2013 | ............. H01M 2/26 |
| JP | 2013-8559 A | | 1/2013 | |

(Continued)

OTHER PUBLICATIONS

Patent Abstracts of Japan and Machine English Translation of Japanese Patent No. 2013-125657 A, Jun. 24, 2013, 13 Pages.

(Continued)

*Primary Examiner* — Jonathan Crepeau
*Assistant Examiner* — Angela J Martin
(74) *Attorney, Agent, or Firm* — Lewis Roca Rothgerber Christie LLP

(57) ABSTRACT

Embodiments of the present invention are directed toward a rechargeable battery including: an electrode assembly including a first electrode and a second electrode, each of which includes an electrode plate and an electrode uncoated region; a case for accommodating the electrode assembly and having an opening; a cap assembly coupled to the opening to seal the case; and a current collecting member between the cap assembly and the electrode assembly and respectively coupled to an electrode uncoated region of the first electrode and an electrode uncoated region of the second electrode. The current collecting member includes a first current collector that faces one side of the cap assembly, a second current collector that contacts the electrode uncoated region, and a connecting portion that is shifted toward one side of the first current collector and connects the first and second current collectors.

12 Claims, 6 Drawing Sheets

(51) Int. Cl.
*H01M 10/04* (2006.01)
*H01M 10/05* (2010.01)
*H01M 10/0525* (2010.01)

(56) References Cited

U.S. PATENT DOCUMENTS

| | | | |
|---|---|---|---|
| 9,118,061 B2 * | 8/2015 | Kim | H01M 2/1241 |
| 2012/0308855 A1 * | 12/2012 | Shimizu | H01M 2/0426 |
| | | | 429/53 |
| 2014/0120396 A1 * | 5/2014 | Kajiwara | H01M 2/263 |
| | | | 429/94 |
| 2014/0308575 A1 * | 10/2014 | Kim | H01M 2/266 |
| | | | 429/179 |
| 2014/0315051 A1 * | 10/2014 | Han | H01M 2/202 |
| | | | 429/61 |

FOREIGN PATENT DOCUMENTS

| | | | | |
|---|---|---|---|---|
| JP | 2013-105671 A | | 5/2013 | |
| JP | 2013-125657 | * | 6/2013 | H01M 2/26 |
| JP | 2013-125657 A | | 6/2013 | |
| JP | 2014-32814 A | | 2/2014 | |
| KR | 10-2012-0013418 A | | 2/2012 | |

OTHER PUBLICATIONS

Patent Abstracts of Japan and Machine English Translation of Japanese Patent No. 2014-32814 A, Feb. 20, 2014, 18 Pages.
Patent Abstracts of Japan and Machine English Translation of Japanese Patent No. 2013-105671 A, May 30, 2014, 21 Pages.

* cited by examiner

RECHARGEABLE BATTERY

CROSS-REFERENCE TO RELATED APPLICATION

This application claims priority to and the benefit of Korean Patent Application No. 10-2014-0106314 filed in the Korean Intellectual Property Office on Aug. 14, 2014, the entire content of which is incorporated herein by reference.

BACKGROUND

1. Technical Field

The described technology relates generally to a rechargeable battery.

2. Description of the Related Art

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be widely used as a power source for driving a motor of hybrid vehicles and the like.

Recently, a high power rechargeable battery using a non-aqueous electrolyte and with high energy density has been developed. The high power rechargeable battery consists of a large-capacity rechargeable battery in which a plurality of rechargeable batteries are connected in series, such that it can be used as a power source for driving a motor of a device requiring a large amount of electric power, such as, for example, an electric vehicle or the like.

The above information disclosed in this Background section is only for enhancement of understanding of the background of the described technology and therefore it may contain information that does not form the prior art that is already known in this country to a person of ordinary skill in the art.

SUMMARY

When a rechargeable battery is subjected to an external impact, components such as an insulator or an electrode assembly may be damaged by a tab or a current collecting member inside the battery.

When the insulator or the electrode assembly is damaged, excessive heat or an explosion may occur. Thus, according to embodiments of the present invention, a rechargeable battery includes an electrode assembly, an insulator, and other components that are prevented from being damaged.

In embodiments of the present invention, a rechargeable battery includes: an electrode assembly including a first electrode and a second electrode, each of which includes an electrode plate and an electrode uncoated region; a case for accommodating the electrode assembly and having an opening; a cap assembly combined to the opening to seal the case; and a current collecting member between the cap assembly and the electrode assembly and respectively coupled to an electrode uncoated region of the first electrode and an electrode uncoated region of the second electrode. The current collecting member includes a first current collector that faces one side of the cap assembly, a second current collector that contacts the electrode uncoated region, and a connecting portion that is shifted toward one side of the first current collector and connects the first and second current collectors.

The second current collector may be bent from the connecting portion to extend toward the electrode assembly.

The connecting portion may be bent in a direction toward the electrode assembly.

The electrode assembly may include a plurality of electrode assemblies.

The second current collector may include a plurality of current collecting plates that respectively contact electrode uncoated regions of the plurality of electrode assemblies.

Horizontal center lines of the second and first current collectors traversing the adjacent current collecting plates may be offset from each other.

The first current collector may have a first terminal hole, a center of which is disposed in the horizontal center line The cap assembly may include a second terminal hole, and may further include a connecting terminal that is inserted into the first and second terminal holes and electrically coupled to the first electrode and the second electrode, respectively.

End portions of the second current collector may be curved in opposite directions with respect to sides that contact the electrode uncoated region.

The electrode assembly may be wound about a winding axis, and may be inserted into the case in a direction parallel to the winding axis.

The electrode uncoated regions of the first electrode and the second electrode may be spaced apart from each other, and may protrude toward the cap assembly from the electrode plates.

When the current collecting member is formed according to embodiments of the present invention, the current collecting member is prevented from pressing and damaging the insulator or the electrode assembly even if the rechargeable battery is subjected to external impacts.

Accordingly, since the rechargeable battery does not explode as a result of the damage, a safer rechargeable battery can be provided.

DETAILED DESCRIPTION

Figure 1:
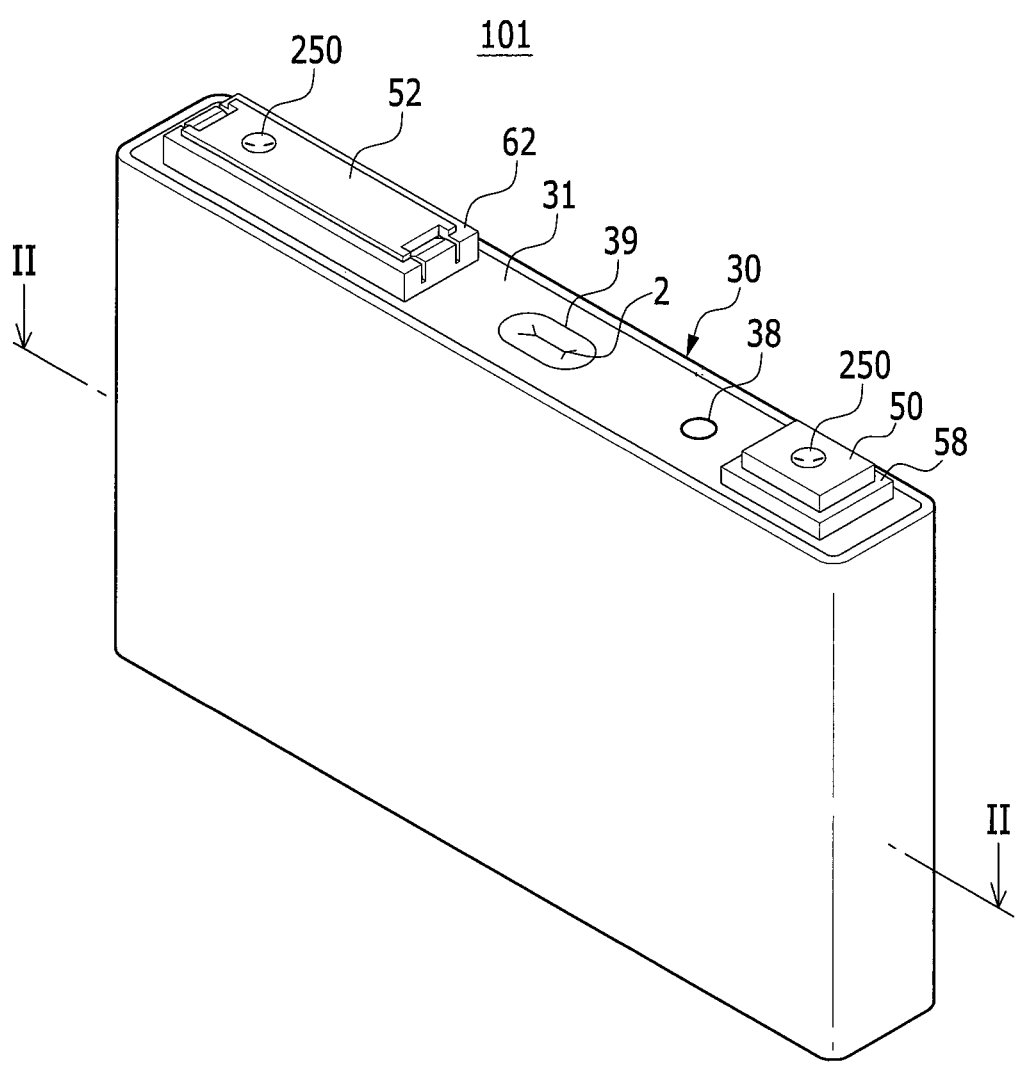
FIG. 1 is a perspective view of a rechargeable battery according to embodiments of the present invention.

Embodiments of the present invention are described more fully hereinafter with reference to the accompanying drawings, in which exemplary embodiments of the invention are shown.

As those skilled in the art would realize, the described embodiments may be modified in various different ways, all without departing from the spirit or scope of the present invention.

Like reference numerals designate like elements throughout the specification and the drawings.

Figure 2:
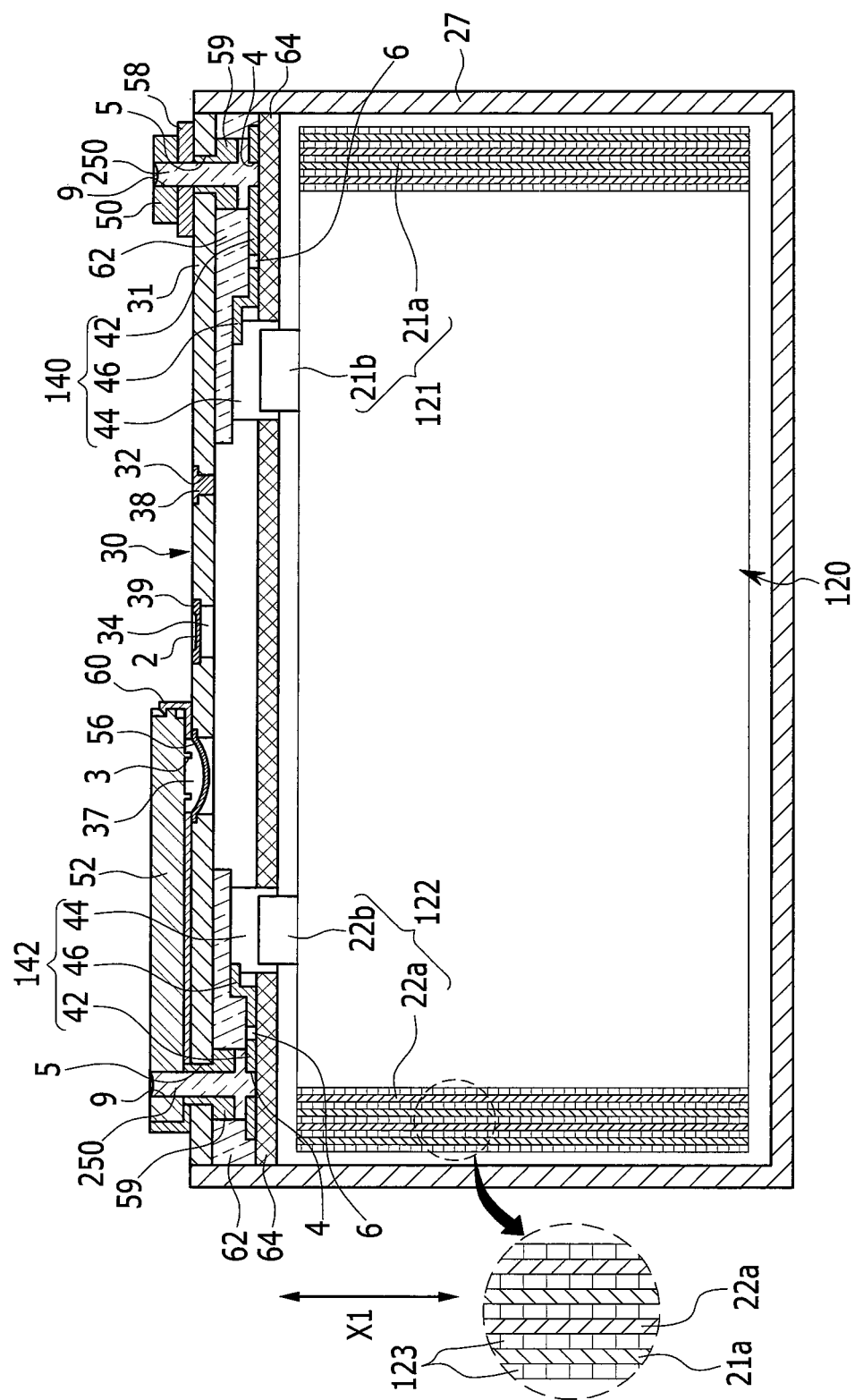
FIG. 2 is a cross-sectional view of FIG. 1 taken along the line II-II.

FIG. 1 is a perspective view of a rechargeable battery according to embodiments of the present invention, and FIG. 2 is a cross-sectional view of FIG. 1 taken along the line II-II.

As shown in FIGS. 1 and 2, the rechargeable battery 101 according to embodiments of the present invention includes an electrode assembly 120, in which a separator 123 is between a first electrode 121 and a second electrode 122 and the separator 123, first electrode 121, and second electrode 122 are wound about an axis. The rechargeable battery 101 further includes current collecting members 140 and 142 that are electrically coupled to the electrode assembly, a case 27 in which the current collecting members 140 and 142 and the electrode assembly 120 are placed, and a cap assembly 30 that covers an opening of the case 27 to seal the case 27.

In FIGS. 1 and 2, the rechargeable battery 101 is illustrated as a prism-shaped lithium ion rechargeable battery.

However, the present invention is not limited thereto, and it may be applied to various types of batteries such as a lithium polymer battery, a cylindrical battery, etc.

After interposing the separator 123 between the first electrode 121 and the second electrode 122, the electrode assembly 120 is spirally wound based on a winding axis X1 and then pressed flat.

The first and second electrodes 121 and 122 include electrode plates 21a and 22a where an active material is coated on a current collector formed of a thin metal foil, and electrode uncoated regions 21b and 22b where the active material is not coated thereon.

The first electrode plate 21a may be formed by coating an aluminum metal foil with an active material such as a transition metal oxide and the like, and the second electrode plate 22a may be formed by coating a copper or nickel metal foil with an active material such as graphite, carbon, or the like.

The first and second electrode uncoated regions 21b and 22b protrude in the same direction toward the cap assembly.

The electrode assembly 120 is inserted into the case 27, and in one embodiment the first and second electrode uncoated regions 21b and 22b protrude upward above the electrode assembly 120.

The first and second electrode uncoated regions 21b and 22b are spaced apart from each other.

Since the first and second electrode uncoated regions 21b and 22b may be formed to protrude upward during manufacturing, they are integrally formed with the first and second electrode plates 21a and 22a, respectively.

In addition, the first and second electrode plates 21a and 22a may be wound or overlapped to form a plurality of thin films, thereby forming the first and second electrode uncoated regions 21b and 22b.

When the plurality of thin films overlap each other, the thin films may be connected to each other by ultrasonic welding to allow current to easily flow.

The separator 123 between the first and second electrode plates 21a and 22a may prevent a short-circuit and allow for movement of lithium ions. The separator 123 may be polyethylene, polypropylene, or a composite film of polyethylene and polypropylene, for example.

The electrode assembly 120 and an electrolyte solution are placed in the case 27.

The electrolyte solution may be composed of an organic solvent such as, for example, EC, PC, DEC, EMC, and DMC, and a Li salt such as $LiPF_6$ and $LiBF_4$.

The electrolyte solution may be in a liquid, solid, or gel state.

The current collecting members include a first current collecting member 140 and a second current collecting member 142 that are respectively coupled to the first electrode uncoated region 21b and the second electrode uncoated region 22b.

Since the first and second current collecting members 140 and 142 are of the same shape, only the first current collecting member 140 is described with reference to FIGS. 3 to 5.

Figure 3:
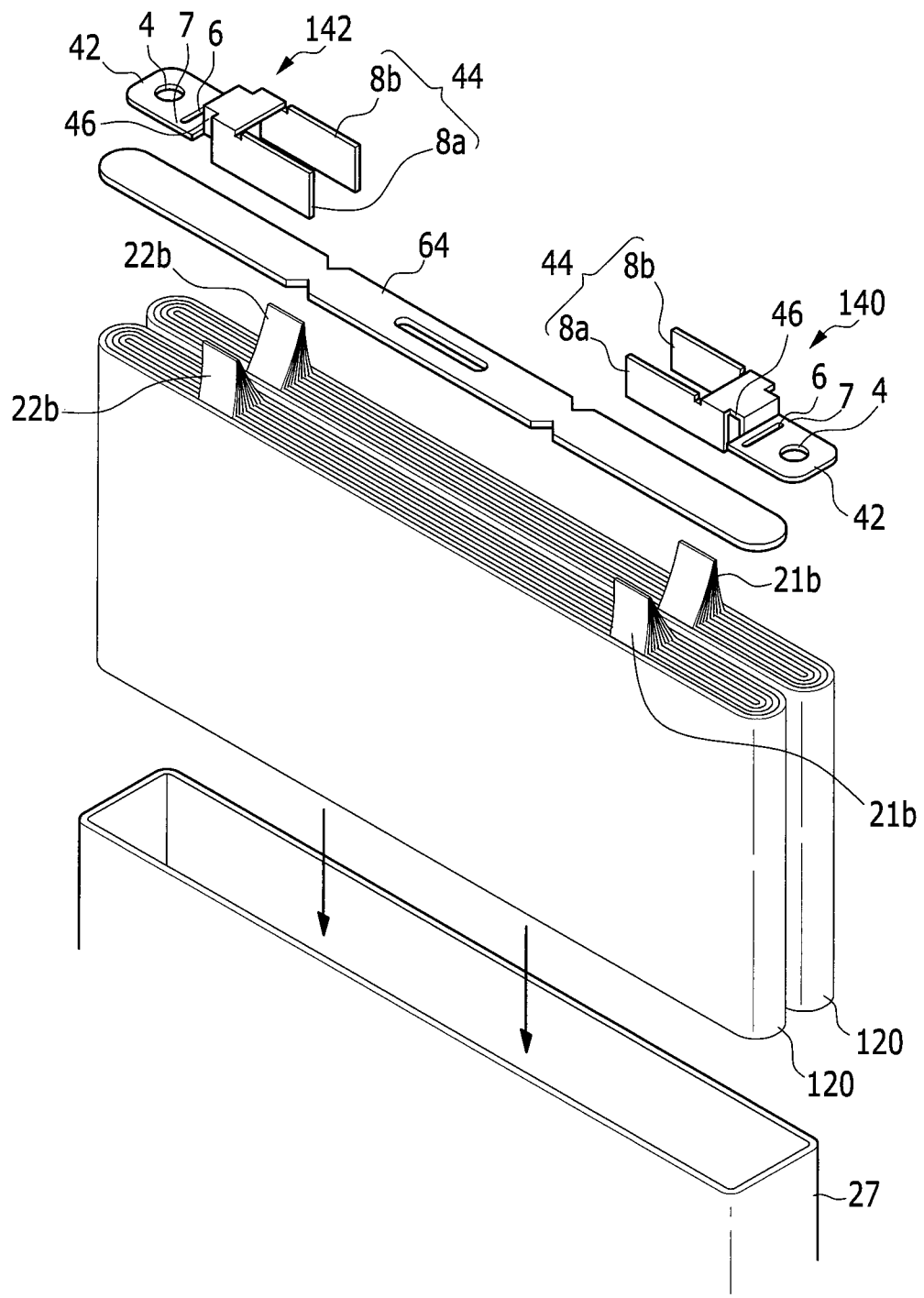
FIG. 3 is a partial exploded perspective view of the rechargeable battery of FIG. 1.
Figure 4:
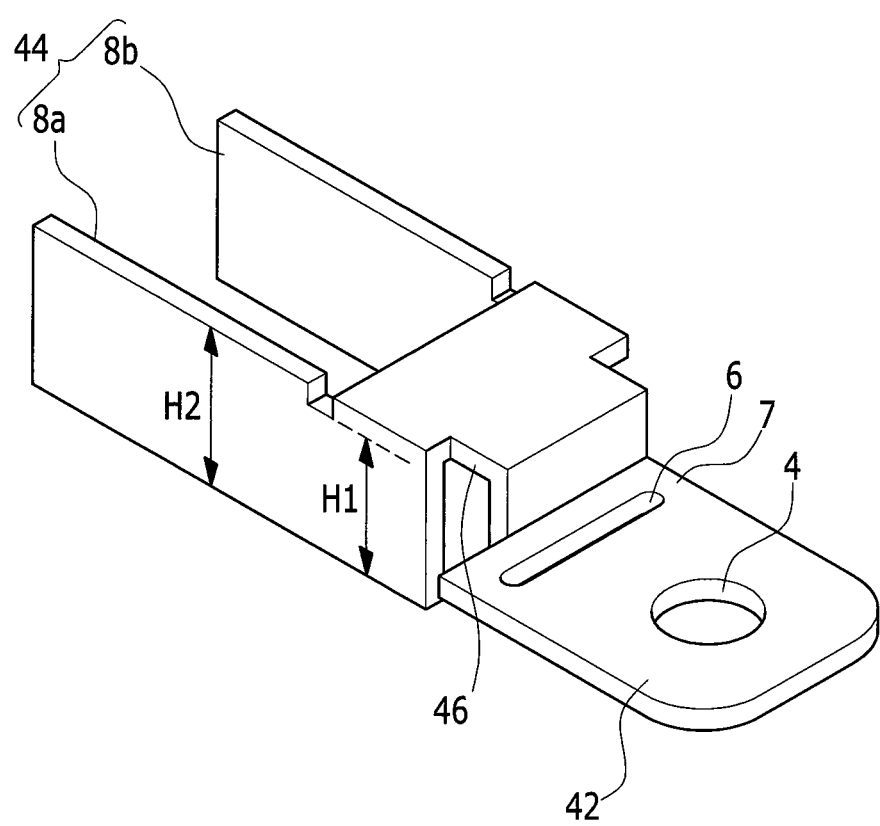
FIG. 4 is a perspective view of a current collecting member according to an embodiment of the present invention.

FIG. 3 is a partial exploded perspective view of the rechargeable battery of FIG. 1, and FIG. 4 is a perspective view of the current collecting member according to embodiments of the present invention.

In FIG. 3, the cap assembly and a first insulating member are not illustrated.

As shown in FIGS. 3 and 4, the first current collecting member 140 includes a first current collector 42, a second current collector 44, and a connecting portion 46 that connects the first and second current collectors 42 and 44.

The first current collecting member 140 may be a low resistance metal such as copper (Cu).

The first current collector 42 may be a plate with a first terminal hole 4 and a fuse hole 6.

A connecting terminal 250 coupled to the first terminal outside of the cap assembly 30 (refer to FIG. 2) may be inserted into the first terminal hole 4 to allow current to flow, and the first terminal hole 4 may have the same shape as a cross-section of the connecting terminal 250, for example, a circular shape.

The fuse hole 6 may be a slit that traverses the first current collector 42 in a width direction, and a fuse 7 is formed of a portion where the fuse hole 6 is formed at opposite sides thereof.

When the temperature of the fuse 7 exceeds a predetermined temperature, the fuse 7 melts (or cuts off), thereby preventing the battery from exploding due to heating.

The second current collector 44 includes at least one or more current collecting plates 8a and 8b.

In FIG. 3, two current collecting plates 8a and 8b are illustrated, but the number of current collecting plates may be one or three or more, depending on the number of electrode assemblies inside the case, since the current collecting plates 8a and 8b are respectively coupled to the electrode uncoated regions of the electrode assembly.

In FIG. 3, for ease of description, sides of the two current collecting plates 8a and 8b facing each other are referred to as inner sides, and sides opposite thereto are referred to as outer sides.

In addition, sides of the two first electrode uncoated regions facing each other are referred to as inner sides, and sides opposite thereto and facing the case are referred to as outer sides.

One side of each current collecting plate 8a and 8b contacts and is coupled to one side of the first electrode uncoated regions 21b, respectively.

In embodiments of the present invention, the outer side of the current collecting plate 8a contacts the inner side of one of the first electrode uncoated regions 21b, and the inner side of the current collecting plate 8b contacts the outer side of the other of the first electrode uncoated regions 21b.

In other embodiments, the inner sides of the current collecting plates 8a and 8b may respectively contact the outer sides of the two first electrode uncoated regions 21b, or the outer sides of current collecting plates 8a and 8b may respectively contact the inner sides of the two first electrode uncoated regions 21b.

As such, the current collecting plates 8a and 8b and the first electrode uncoated regions 21b may be selectively coupled if necessary.

The connecting portion 46 may extend from one side of the first current collector 42, and may be bent toward the cap assembly and the second current collector 44 to be coupled to the second current collector 44.

Figure 5:
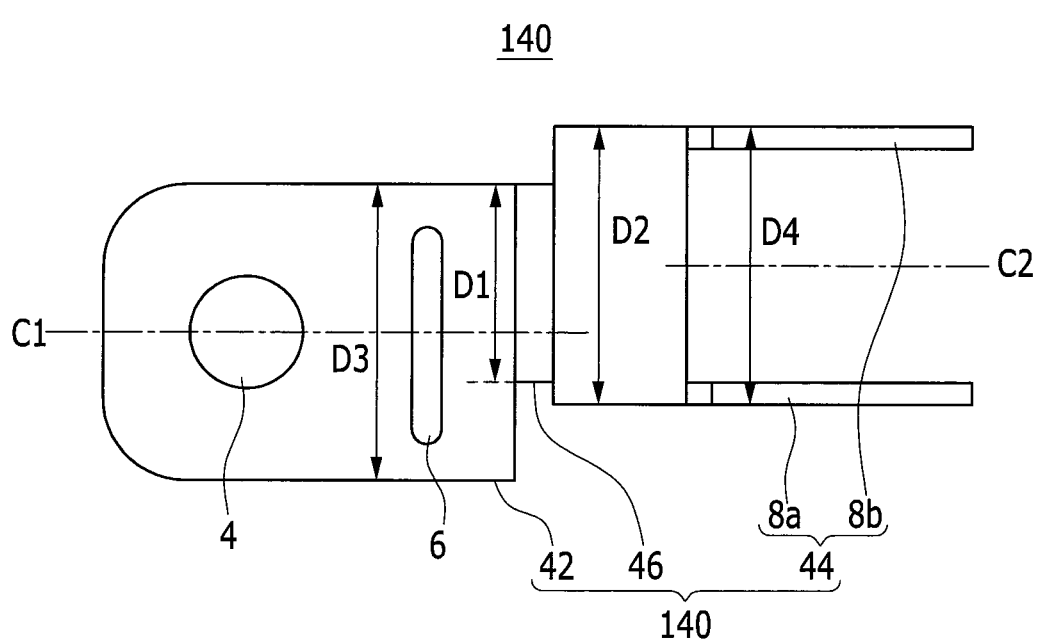
FIG. 5 is a top plan view of a current collecting member according to an embodiment of the present invention.

FIG. 5 is a top plan view of the current collecting member according to embodiments of the present invention.

Referring to FIG. 5, the connecting portion 46 may have a first width D1 and a second width D2, where the first width D1 is smaller than the second width D2. The portion of the connecting portion 46 coupled to the first current collector 42 may be the first width D1 and the portion of the connecting portion 46 coupled to the second current collector 44 may be the second width D2.

In addition, the first width D1 is smaller than a third width D3 of the first current collector 42.

Since the first width D1 of the connecting portion 46 is formed smaller than the third width D3 of the first current collector 42, the connecting portion 46 may be shifted toward one side of the first current collector 42.

Further, a first horizontal center line C1 traversing the first terminal hole 4 and the fuse hole 6 of the first current collector 42 may be offset from a second horizontal center line C2 traversing between the current collecting plates 8a and 8b.

In some embodiments, the second horizontal center line C2 extends in the same direction as the first horizontal center line C1.

As shown in FIG. 4, the current collecting plates 8a and 8b may have a first height H1 and a second height H2, where the first height H1 is smaller than the second height H2. The respective portion of each current collecting plates 8a and 8b that extends from the connecting portion 46 may be the first height H1 and the other portions of the current collecting plates 8a and 8b may be the second height H2.

In some embodiments, the current collecting plates 8a and 8b may be integrally formed with the connecting portion 46 and bent therefrom. In other embodiments, the current collecting plates 8a and 8b and the connecting portion 46 may be separately manufactured and welded or otherwise coupled to each other.

Referring again to FIG. 3, the connecting portions 46 of the first and second current collecting members 140 and 142 are respectively aligned toward different sides of the first current collectors 42.

In one embodiment, the connecting portion 46 of the first current collecting member 140 may be offset toward the current collecting plate 8b that is relatively located near the back of the case 27 and the connecting portion 46 of the second current collecting member 142 may be offset toward the current collecting plate 8a that is relatively located near the front of the case 27.

In some embodiments, the connecting portions 46 of the first and second current collecting members 140 and 142 may both be offset toward the current collecting plate 8a or toward the current collecting plate 8b.

Referring back to FIGS. 1 to 3, the case 27 has a substantially cuboid shape, and an opening is formed at one side thereof.

The case 27 may be formed of a metal such as aluminum, stainless steel, etc.

The cap assembly 30 includes a cap plate 31 that covers the opening of the case 27, a first terminal 50 that protrudes outside of the cap plate 31 and is electrically coupled to the first electrode 121, and a second terminal 52 that protrudes outside of the cap plate 31 and is electrically coupled to the second electrode 122.

The cap plate 31 has an elongated plate shape that extends in one direction and covers the opening of the case 27.

The cap plate 31 and the case 27 may be the same material, and the cap plate 31 may be attached to the case 27 by a laser welding method.

Accordingly, the cap plate 31 may have the same polarity as the case 27.

The cap plate 31 includes an electrolyte injection opening 32 into which an electrolyte solution is injected, and a second terminal hole 5 into which the connecting terminal 250 is inserted.

The cap plate 31 also includes a vent hole 34 with a vent plate 39 that has a notch 2 that opens at a predetermined pressure.

The electrolyte injection opening 32 includes a sealing cap 38 in the electrolyte injection opening 32, and the connecting terminal 250 is inserted into the second terminal hole 5.

The first and second terminals 50 and 52 may be on the cap plate 31.

The first terminal 50 is electrically coupled to the first electrode 121 through the first current collecting member 140, and the second terminal 52 is electrically coupled to the second electrode 122 through the second current collecting member 142.

However, the present invention is not limited thereto, and the first terminal 50 may be electrically coupled to the second electrode 122, and the second terminal 52 may be electrically coupled to the first electrode 121, for example.

In some embodiments, the first terminal 50 has a rectangular plate shape.

The first terminal 50 is inserted in a third terminal hole 9 of the first terminal 50 and in the first and second terminal holes 4 and 5, and is electrically coupled to the first electrode 121 through the connecting terminal 250 that is bonded to the first current collecting member 140.

The connecting terminal 250 has a pillar shape, an upper end of which is welded to the first terminal 50 upon insertion into the third terminal hole 9.

Further, a lower end of the connecting terminal 250 is welded to the first current collecting member 140 upon insertion into the first terminal hole 4.

Accordingly, the first electrode 121 is electrically coupled to the first terminal 50 through the first current collecting member 140 and the connecting terminal 250.

The second terminal hole 5 includes a sealing gasket 59 that insulates the connecting terminal 250 from the cap plate 31.

Similar to the first terminal 50, the second terminal 52 is electrically coupled to the second current collecting member 142 and to the second electrode 122 through the connecting terminal 250 that is inserted into the first to third terminal holes 4, 5, and 9.

A connecting member 58 is between the first terminal 50 and the cap plate 31, and a first insulating member 60 is between the second terminal 52 and the cap plate 31.

Accordingly, the case 27 and the cap plate 31 are electrically coupled to the first terminal 50 through the connecting member 58, thereby having the same polarity as the first electrode 121.

In addition, the second terminal 52 is insulated from the cap plate 31 by the first insulating member 60.

The second terminal 52 includes a short-circuit protrusion 3 that protrudes toward a short-circuit hole 37 in the cap plate 31.

The second terminal 52 is elongated in one direction to cover the short-circuit hole 37.

Accordingly, the first insulating member 60 may be elongated along the second terminal 52, and may enclose a lateral side of the second terminal 52.

In FIGS. 1 and 2, the first and second terminals 50 and 52 are illustrated as having different lengths, but the length of the first terminal 50 may be the same as the length of the second terminal 52.

The short-circuit hole 37 of the cap plate 31 includes a short-circuit member 56 that is coupled to a side wall of the short-circuit hole 37 and may short-circuit the first electrode 121 with the second electrode 122.

The short-circuit member 56 includes a curved portion that is convexly curved in an arc shape toward the electrode assembly 120, and edge portions at opposite sides of the curved portion fixed to the side wall of the short-circuit hole 37.

An abnormal reaction inside the rechargeable battery can generate gas, which increases internal pressure of the rechargeable battery.

When the internal pressure of the rechargeable battery exceeds a predetermined pressure, the curved portion of the short-circuit member 56 is convexly deformed toward the second terminal 52 to contact the short-circuit protrusion 3 of the second terminal 52, thereby causing a short circuit.

When the short circuit occurs, the battery reaction stops, preventing (or reducing the risk of) explosion or other damage due to the increased internal pressure.

In addition, when the short circuit occurs, the fuse 7 melts and cuts off an instantaneously generated high short-circuit current, thereby preventing the short-circuit current from further flowing though the case 27.

A second insulating member 62 is between the cap plate 31 and the first and second current collecting members 140 and 142, and a third insulating member 64 is between the first and second current collecting members 140 and 142 and the electrode assembly 120. The second and third insulating members 62 and 64 may both insulate and support the first current collecting member 140 and the second current collecting member 142.

As described above, the first and second current collecting members may prevent the insulating member and the electrode assembly from being damaged even if impacts are delivered to the rechargeable battery.

In embodiments of the present invention, the first and second current collecting members each include the first current collector, the second current collector, and the connecting portion, with the horizontal center lines of the first and second current collectors offset from each other, and the connecting portions shifted toward one side of the first current collectors.

Since the first and second horizontal center lines are offset from each other and the connecting portions are shifted toward one side, impacts are not uniformly delivered to the first or second current collecting member, and thus delivered to either one of the first and second current collecting members.

Accordingly, if the current collecting plate is damaged upon an external impact, the current collecting plate may be prevented from pressing and damaging the insulator above the current collecting plate or the electrode assembly below the current collecting plate, since the force applied to the second current collector is directed toward one side.

Figure 6:
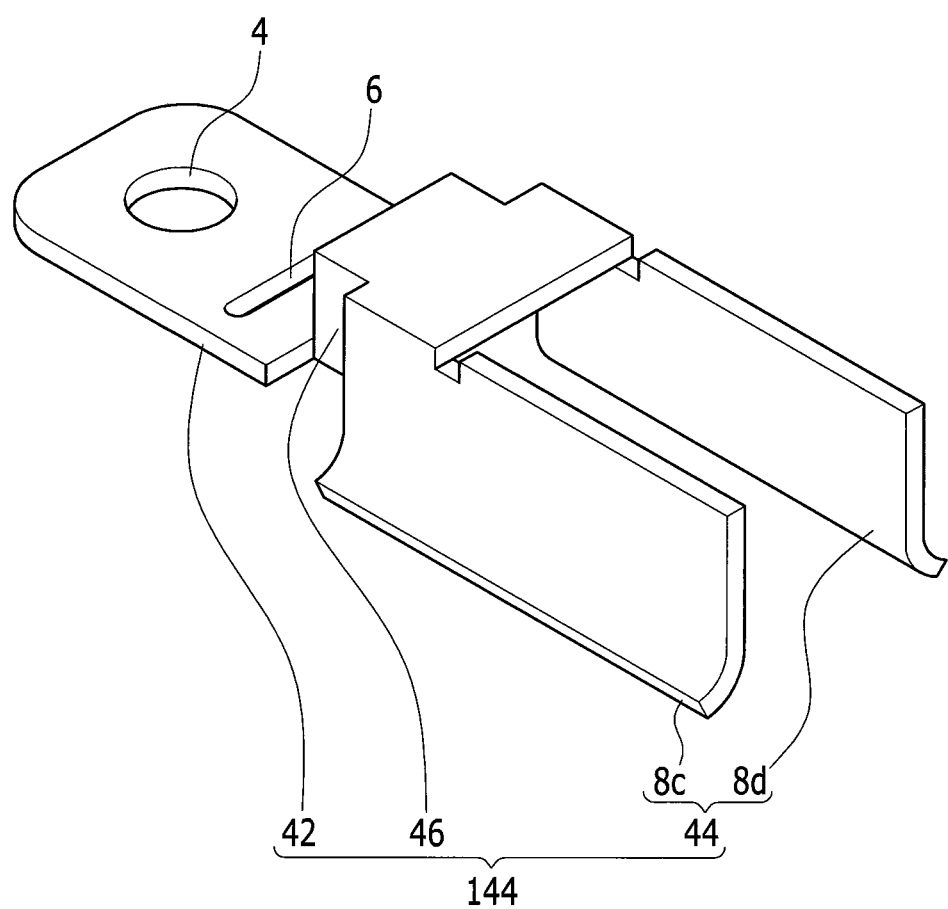
FIG. 6 is a perspective view of a current collecting member of a rechargeable battery according to another embodiment of the present invention.

FIG. 6 is a perspective view of a current collecting member of a rechargeable battery according to other embodiments.

In the current collecting member 144 of FIG. 6, end portions of current collecting plates 8c and 8d are each curved in a direction away from the electrode uncoated regions 21b and 22b.

In FIG. 6, the end portions of the current collecting plates 8c and 8d curve outwardly in opposite directions, but they are not limited thereto and may curve inwardly in the same direction such that the end portions face each other.

As such, when the current collecting plates 8c and 8d are curved, the current collecting plates 8c and 8d are inclined in the curved direction and any impacts delivered to the current collecting member are distributed in the curved direction, thereby preventing the current collecting plates from pressing and thus damaging the insulator and the electrode assembly.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols |
| --- |
| 2: notch |
| 3: short-circuit protrusion |
| 4: first terminal hole |
| 5: second terminal hole |
| 6: fuse hole |
| 7: fuse |
| 8: current collecting plate |
| 21a: first electrode plate |
| 22a: second electrode plate |
| 21b: first electrode uncoated region |
| 22b: second electrode uncoated region |
| 25: connecting terminal |
| 27: case |
| 30: cap assembly |
| 31: cap plate |
| 32: electrolyte injection opening |
| 34: vent hole |
| 37: short-circuit hole |
| 38: sealing cap |
| 39: vent plate |
| 42: first current collector |
| 44: second current collector |
| 46: connecting portion |
| 50: first terminal |
| 52: second terminal |
| 56: short-circuit member |
| 58: connecting member |
| 59: sealing gasket |
| 60: first insulating member |
| 62: second insulating member |
| 64: third insulating member |
| 140: first current collecting member |
| 142: second current collecting member |
| 250: connecting terminal |

What is claimed is:

1. A rechargeable battery comprising:
an electrode assembly comprising a first electrode and a second electrode, the first and second electrodes each comprising an electrode plate and an electrode uncoated region;
a case accommodating the electrode assembly;
a cap assembly coupled to the case to seal the case; and current collecting members between the cap assembly and the electrode assembly and coupled to the electrode uncoated region of the first electrode and the electrode uncoated region of the second electrode, respectively, wherein the current collecting members each comprise a first current collector that faces one side of the cap assembly, a second current collector that contacts the electrode uncoated region, and a connecting portion that is offset toward one side of the first current collector and connects the first and second current collectors, wherein each electrode plate defines a first edge facing the cap assembly, wherein both current collecting members are located at the first edge, wherein the electrode uncoated regions of both the first and second electrodes are spaced from each other and protrude in a height direction towards the cap assembly away from the first edge of the respective electrode plate, the electrode uncoated regions being located between the cap assembly and the electrode plates, wherein the first current collector and the connecting portion face an end of the electrode plate of the first electrode and an end of the electrode plate of the second electrode, wherein the electrode plates of the first electrode and the second electrode are completely below the electrode uncoated regions of both the first and second electrodes, and wherein a distance between a portion of the first current collector that is closest to the cap assembly along the height direction and the cap assembly along the height direction is greater than a distance between a portion of the second current collector that is closest to the cap assembly along the height direction and the cap assembly along the height direction.

2. The rechargeable battery of claim 1, wherein the second current collector is bent from the connecting portion to extend toward the electrode assembly.

3. The rechargeable battery of claim 2, wherein the connecting portion is bent in a direction toward the electrode assembly.

4. The rechargeable battery of claim 2, wherein the electrode assembly comprises a plurality of electrode assemblies.

5. The rechargeable battery of claim 4, wherein the second current collector comprises a plurality of current collecting plates that respectively contact electrode uncoated regions of the plurality of electrode assemblies.

6. The rechargeable battery of claim 5, wherein horizontal center lines of the second and first current collectors traversing adjacent ones of the current collecting plates are offset from each other.

7. The rechargeable battery of claim 6, wherein the first current collector has a first terminal hole centered along the horizontal center line.

8. The rechargeable battery of claim 7, wherein the cap assembly further comprises a second terminal hole and a connecting terminal that is in the first and second terminal holes and electrically coupled to the first electrode and the second electrode, respectively.

9. The rechargeable battery of claim 1, wherein the second current collector has end portions that are curved in a direction away from the sides of the second current collector that contact the electrode uncoated region.

10. The rechargeable battery of claim 1, wherein the electrode assembly is wound about a winding axis, wherein the case is defined along a length direction, a width direction, and the height direction, wherein the cap assembly is defined along the length direction and the width direction, and has a thickness in the height direction, and wherein the electrode assembly is oriented in the case such that the height direction is parallel to the winding axis.

11. The rechargeable battery of claim 1, wherein the electrode plate of the first electrode is integrally formed with the electrode uncoated region of the first electrode.

12. The rechargeable battery of claim 6, wherein the first current collector further comprises a fuse hole.

* * * * *